(12) United States Patent
Doumuki (10) Patent No.: US 6,250,778 B1
(45) Date of Patent: Jun. 26, 2001

(54) LIGHTING SYSTEM, AND IMAGE DISPLAY APPARATUS

(75) Inventor: Tohru Doumuki, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/473,881

(22) Filed: Dec. 28, 1999

(30) Foreign Application Priority Data

Dec. 29, 1998 (JP) .................................................. 10-377712

(51) Int. Cl.⁷ ....................................................... F21V 5/00
(52) U.S. Cl. .......................... 362/327; 362/268; 362/299; 362/328; 362/343
(58) Field of Search .................................... 362/298, 299, 362/327, 328, 346, 268, 301, 343, 259

(56) References Cited

U.S. PATENT DOCUMENTS 5,991,489 * 6/1999 Watanabe ................................ 353/98
5,993,010 * 6/1999 Ohzawa et al. ......................... 353/98

* cited by examiner

*Primary Examiner*—Stephen Husar
*Assistant Examiner*—John Anthony Ward
(74) *Attorney, Agent, or Firm*—Sonnenschein, Nath & Rosenthal (57) ABSTRACT

A lighting system consists of a first reflector having a plurality of reflecting faces disposed obliquely with an angle of about 45 deg. with respect to the optical axis of an incident coherent light, respectively, and spaced a predetermined distance from each other in the optical-axial direction of the incident coherent light, a second reflector having a plurality of reflecting faces disposed obliquely at an angle of about 45 deg. with respect to the optical axes of reflected light beams, respectively, from the first reflector, and spaced a predetermined distance from each other in the optical-axial direction of the incident coherent light, and a lens array having a plurality of lenses disposed in planes generally perpendicular to the optical axes of the reflected light beams from the second reflector.

7 Claims, 5 Drawing Sheets

LIGHTING SYSTEM, AND IMAGE DISPLAY APPARATUS

RELATED APPLICATION DATA

The present application claims priority to Japanese Application No. P10-377712 filed Dec. 29, 1998, which application is incorporated herein by reference to the extent permitted by law.

BACKGROUND OF THE INVENTION

1. Field of the Invention

The present invention relates to a lighting system and an image display apparatus using the lighting system.

2. Description of the Related Art

As one of the conventional image display apparatuses, there has so far been proposed an optical projector adapted to illuminate a liquid crystal panel which displays an image and project onto a screen a light reflected from or transmitted through the liquid crystal panel. Normally, such a projector uses a metal halide lamp, halogen lamp or xenon lamp as a light source. However, such lamps as a light source are disadvantageous in some respects which adversely affect the utility value of the lamps, as will be described below.

First, the lamp has a short service life. For example, the metal halide lamp has a light of about 2,000 hours. Therefore, the lamp has to be replaced frequently. For easy replacement when the service life has expired, the lamp has to be housed in a removable cartridge, for example.

Further, the projector is adapted to extract three primary colors (red, green and blue) from a white light from the lamp. So, the optical system for this RGB extraction is unavoidably designed to have a large volume, the color reproduction domain is limited and the efficiency for light utilization is lower.

To solve these problems, it has also been tried to use as a light source a semiconductor device such as light-emitting diode (LED) or a semiconductor laser. Generally, the LED has a service life of more than 10,000 hours, for example. However, the directivity of light from the LED is low. Namely, the light is emitted from the LED divergently. Concerning the LED, the efficiency for light utilization cannot easily be improved.

In this respect, it can be said that the semiconductor laser can emit light with an excellent directivity. Thus, the light from the semiconductor laser can be utilized with a high efficiency. Further, the semiconductor laser has a long service life. Generally, the semiconductor laser has a higher efficiency for energy utilization than the LED. Moreover, because of the monochromaticity, a large color reproduction domain can be set with the semiconductor laser.

When the semiconductor laser is used as a light source for the above-mentioned projector, however, its speckle noise is a problem in the application in consideration as will be described below.

Generally, it can be regarded that when a laser source is used as a light source in an image display apparatus, for example, various points and areas on an object surface or a screen, for example, which is thus illuminated are collectively contributed to formation of an image on an image surface or a viewer's retina, for example. In this case, it is natural that the object surface has a roughness which is larger than the magnitude of the wavelength of the light. Namely, light beams in a complicated phase relation with each other overlap on each other on he image surface. If the light beams are coherent with each other, the result of the coherence will cause a complex light-dark pattern. The complex light-dark pattern is a "speckle" which would considerably degrade the image quality in an image display apparatus, if applied. Generally, the semiconductor laser is sufficiently coherent to arise the speckle noise.

For another image display with a laser light, a laser scanning type image display apparatus has also been proposed. Also this laser scanning type image display apparatus unavoidably incurs the aforementioned speckle noise problem. Generally, the laser scanning type image display apparatus is basically configured such that an outgoing light from a laser source is focused by a lens and projected as a spot on a screen, and a polarizer disposed in the optical path is used to scan the focused spot two-dimensionally on the screen to display an image. Thus, the human eyes will see a light reflected from or transmitted through the screen.

In this case, on the image surface of the retina, the light beams within the focused spot will overlap on each other at an image point with a random phase change on the screen. Thus, the difference in optical path length between the light beams overlapping on each other at the image point will extremely be small, and so the light beams will cohere with each other, resulting in the speckles.

The speckle noise is a problem experienced commonly with the semiconductor lasers and highly coherent laser sources. Many approaches have ever been proposed to solve this speckle noise problem. A typical one of the conventional approaches is to use a rotary diffusion plate. That is, a random-diffusion plate made of a ground glass, for example, is inserted between an illuminating light source and a to-be-illuminated surface, the diffusion plate is rotated to vary, as the time passes, a speckle pattern occurring in an image surface, and the speckle pattern is averaged under a storage effect within the response speed of a light detection system. The response speed of the human eyes, for example, is said to about 30 msec. By rotating the diffusion plate at a sufficient speed for the speckle pattern to vary many rounds within the time of 30 msec, the speckle pattern can be made not recognizable by the human eyes.

Since the rotary diffusion plate has a nature to diverge the light, however, it will, when inserted in an optical system, cause a loss of incident light. Especially, if the rotary diffusion plate is used in the laser scanning type image display apparatus, it will cause a large loss of the light that can be focused on the screen. The rotary diffusion plate has to be driven to rotate by a motor, which will lead to a large volume of the optical system, a large energy consumption, an unignorable operating sound, etc. which all are not preferable for the image display apparatus as a household electric appliance.

Another approach has been proposed to reduce the speckle noise. It is to split a coherent light having some coherence length into a plurality of light beams having a difference in optical path length from each other, the difference being larger than the coherence length, and then join them together or array them. This approach is advantageous in that the light beams are incoherent with each other. Therefore, by splitting the coherent light into a larger number of light beams, it is possible to reduce the degree of spatial coherence with each other of the joined or arrayed light beams. As a well-known example of this approach, an optical fiber bundle has been proposed. In this approach, a plurality of optical fibers is bundled together. The optical fibers are cut to different lengths from each other for different optical path lengths from each other so that each of the differences in optical path length is set larger than the coherence length of an incident coherent light. The optical fibers are arranged to be flush at either end thereof with each other. Thus, when a coherent is incident upon one end of the fiber bundle, outgoing light beams from the other end of the bundle will be inherent with each other. Therefore, the spatial coherence is totally reduced. By using the outgoing coherent light beams as a light source in the image display apparatus, it is possible to reduce the speckle noise on the illuminated surface.

However, the aforementioned approach using the optical fiber bundle is disadvantageous as will be described below. It is assumed for example that fifty-one optical fibers having a difference in length of 1 cm from each other are bundled together for the above approach, the length difference between the shortest and longest optical fibers is 50 cm. For housing, in an image display apparatus, for example, the optical fibers bundled together to be flush at either end thereof with each other, the image display apparatus has to be designed large in volume, which will be a barrier against a compact design of the image display apparatus. Also, the numerical aperture at the incident end of the optical fiber bundle is smaller than 1, which will cause a loss of incident coherent light upon the fiber bundle. Further, light beams go out of the optical fibers at the other end, namely, light-outgoing end, of the optical fiber bundle, so that the outgoing light consists of divergent light beams going out of the light-outgoing ends each having an increased sectional area. This will cause a light loss at the downstream optical system. Furthermore, it is basically difficult to massively produce such fiber bundles. That is, this approach is also not suitable for employment in any household image display apparatuses.

Any means, if used, for providing the above-mentioned differences in optical path length between the optical fibers will not permit to sufficiently reduce the spatial coherence of a coherent light emitted from a coherent light source having a single-mode power spectrum since the coherence length of the coherent light is generally sufficiently long. In case a single-mode power spectrum semiconductor laser, for example, is used as a light source, the typical spectrum width is 100 MHz. Therefore, the coherence length will be 3 m or so. An optical system having such a large optical path length difference will have a considerably large volume, which will be a large barrier against employment of the optical system in the household image display apparatuses.

OBJECT AND SUMMARY OF THE INVENTION

It is therefore an object of the present invention to overcome the above-mentioned drawbacks by providing a lighting system having a compact and industrially mass-producible design while permitting to reduce the spatial coherence or speckles, and an image display apparatus using the lighting system.

According to the present invention, there is provided a lighting system including:
  a first reflective member having a plurality of reflecting faces disposed obliquely with an angle of about 45 deg. with respect to the optical axis of an incident coherent light, respectively, and spaced a predetermined distance from each other in the optical-axial direction of the incident coherent light;
  a second reflective member having a plurality of reflecting faces disposed obliquely at an angle of about 45 deg. with respect to the optical axes of reflected light beams, respectively, from the first reflective member, and spaced a predetermined distance from each other in the optical-axial direction of the incident coherent light;
  a lens array having a plurality of lenses disposed in planes generally perpendicular to the optical axes of the reflected light beams from the second reflective member; and
  a condenser lens.

In the above lighting system, the incident coherent light is sequentially reflected by the first and second reflective members to split the incident coherent light beam into a plurality of light beams having predetermined differences in optical path length from each other, the plurality of light beams are guided for incidence upon the lenses included in the lens array and corresponding one-to-one to the light beams, and transmitted through the condenser lens, thereby illuminating one and the same area on a to-be-illuminated surface disposed at a focal point of the condenser lens.

According to the present invention, there is also provided a lighting system including:
  an optical element formed integrally from:
    a first reflective member having a plurality of reflecting faces disposed obliquely with an angle of about 45 deg. with respect to the optical axis of an incident coherent light, respectively, and spaced a predetermined distance from each other in the optical-axial direction of the incident coherent light;
    a second reflective member having a plurality of reflecting faces disposed obliquely at an angle of about 45 deg. with respect to the optical axes of reflected light beams, respectively, from the first reflective member, and spaced a predetermined distance from each other in the optical-axial direction of the incident coherent light; and
    a lens array having a plurality of lenses disposed in planes generally perpendicular to the optical axes of the reflected light beams from the second reflective member; and
  a condenser lens.

In the above lighting system, the incident coherent light is sequentially reflected by the first and second reflective members to split the incident coherent light beam into a plurality of light beams having predetermined differences in optical path length from each other, the plurality of light beams are guided for incidence upon the lenses included in the lens array and corresponding one-to-one to the light beams, and transmitted through the condenser lens, thereby illuminating one and the same area on a to-be-illuminated surface disposed at a focal point of the condenser lens.

According to the present invention, there is also provided an image display apparatus including:
  the above-mentioned lighting system; and
  an image display member illuminated by the lighting system to display an image.

In the above lighting system and image display apparatus, the incident coherent light is split two-dimensionally in a plane perpendicular to the optical axis of the incident coherent light to provide the plurality of light beams different in optical path length from each other. Each of the light beams is passed through one of the lenses included in the lens array and disposed two-dimensionally a predetermined distance from each other. The plurality of outgoing light beams from the lenses in the lens array are passed through the condenser lens having generally same focal points and disposed downstream of the arrayed lenses, and reach the to-be-illuminated surface. The to-be-illuminated surface is disposed at the downstream focal point of the condenser lens. That is, the split light beams will be irradiated onto almost one and the same area on the focal plane. Therefore, the light beam incident upon one point in the to-be-illuminated area will be composed of an assembly of the plurality of light beams different in optical path length from each other. By selecting an appropriate optical path length difference, it is possible to make the plurality of light beams incoherent with each other and reduce the possible speckles on the illuminated surface.

Also, by employing the lighting system according to the present invention in an image display apparatus, it is possible to reduce the speckles and this provide a quality image.

By the way, as the Japanese Patent Application No. 10-137823 discloses in detail, if a multi-mode semiconductor laser, for example, which emits coherent light beams different in wavelength from each other is used as a light source, a following effect will be assured. Generally, a multi-mode laser has a plurality of oscillating frequencies different from each other by a predetermined value depending upon the length of a laser resonator, the degrees of coherence determined from the power spectrum are maximum values different the predetermined value from each other. On the assumption that the full width at half maximum of the maximum waveform is $\tau_t$ and the distance between the maximum waveform and a neighboring maximum waveform is $\tau_d$, when the optical path length difference 1 between two light beams meets a following relation:

$$c\{(n-1)\tau_d+\tau_t/2\}<1<c(n\tau_d-\tau_t/2)$$

where c is a speed of light and n is a natural number, the two light beams will be regarded as generally incoherent. They will hardly cohere with each other. In the case of the multi-mode semiconductor laser, for example, $c\tau_d$ is about 0.5 mm and $c\tau_t$ is about 4.0 mm. Therefore, when the two light beams are made to have an optical path length difference of 3 mm between them, the multi-mode semiconductor laser can applied to the aforementioned lighting system to effectively reduce the speckles.

The present invention can be applied to a lighting system in which a coherent light generated from a light source which generates a coherent light such as a semiconductor laser is used for lighting, and an image display apparatus using the lighting system.

These objects and other objects, features and advantages of the present intention will become more apparent from the following detailed description of the preferred embodiments of the present invention when taken in conjunction with the accompanying drawings.

DETAILED DESCRIPTION OF THE PREFERRED EMBODIMENTS

Figure 1:
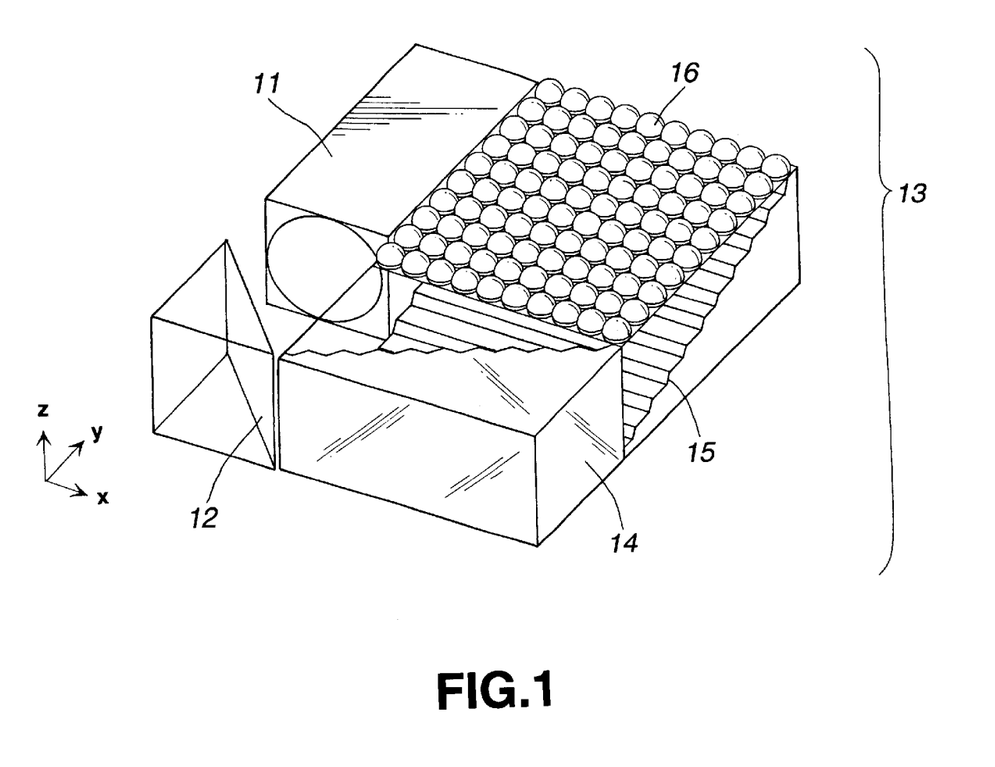
FIG. 1 is a perspective view of an embodiment of the lighting system according to the present invention.

First embodiment:

Referring now to FIG. 1, there is illustrated a first embodiment of the lighting system according to the present invention. The lighting system is comprised of an optical element generally indicated with a reference 13. The optical element 13 includes a first stepped mirror 14, second stepped mirror 15 and a lens array 16.

The lighting system further includes a semiconductor-laser light source 11 and a reflector 12. The semiconductor-laser light source 11 includes a semiconductor laser, optical part to shape an outgoing light beam from the semiconductor laser or lens to collimate the light beam, etc. to emit a light beam collimated to have a generally circular section.

Figure 2:
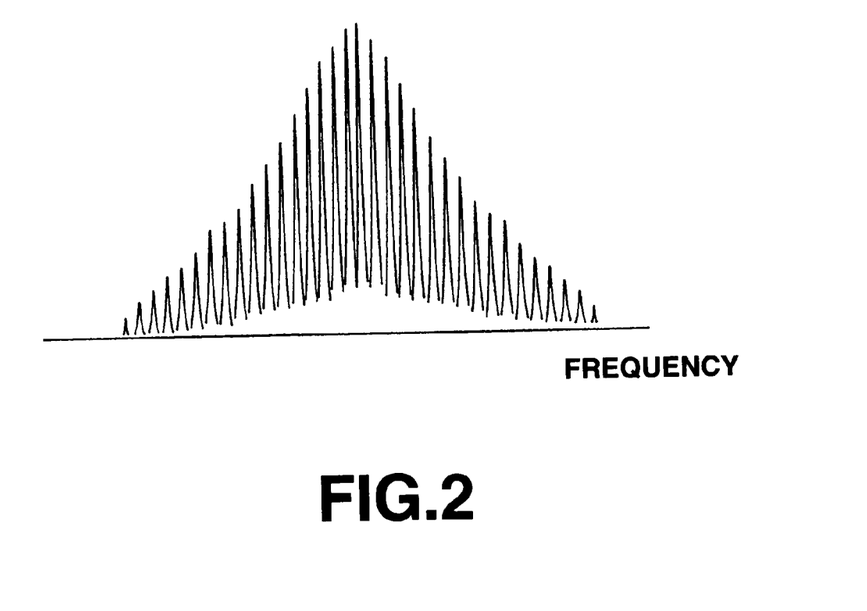
FIG. 2 graphically illustrates the oscillating frequency of a semiconductor laser used in the lighting system.
Figure 3:
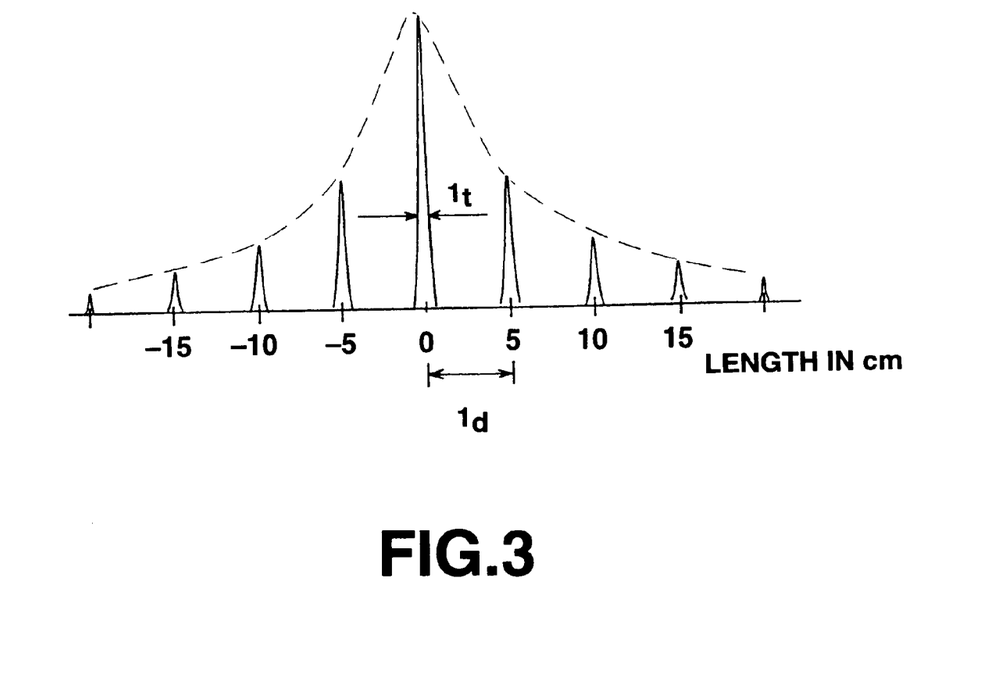
FIG. 3 graphically illustrates the degree of coherence of the semiconductor laser.

FIG. 2 graphically illustrates the oscillating frequency of the semiconductor laser. As shown, the semiconductor laser oscillates with a plurality of periodic oscillating frequencies, namely, in the so-called multi-mode. FIG. 3 graphically illustrates the degree of coherence of the semiconductor laser. As will be seen from FIG. 3, the degree of coherence of the semiconductor laser periodically shows maximum values. When the full width at half maximum of a first maximum waveform is taken as $1_t$ and the maximum distance between the first maximum waveform and a second maximum waveform neighboring the first one is $1_d$, they can be numerically shown as $1_t \approx 0.2$ mm and $1_d \approx 4$ mm, for example.

Figure 4:
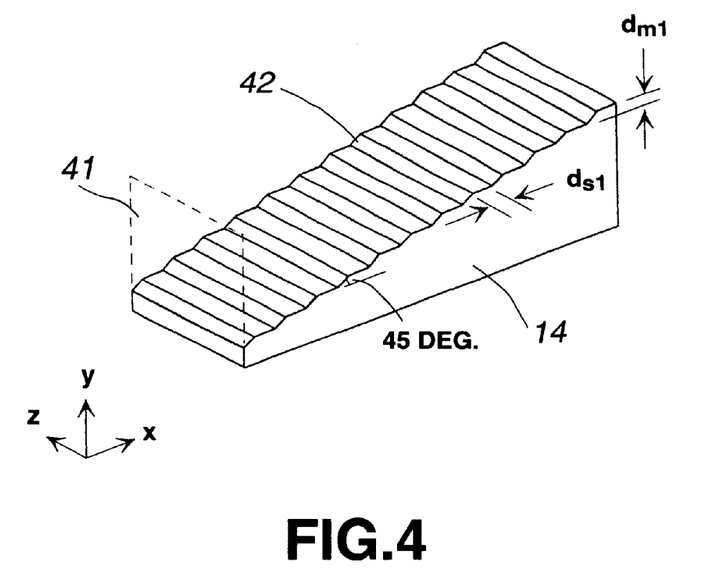
FIG. 4 is a perspective view of a first reflective member of the lighting system.
Figure 5:
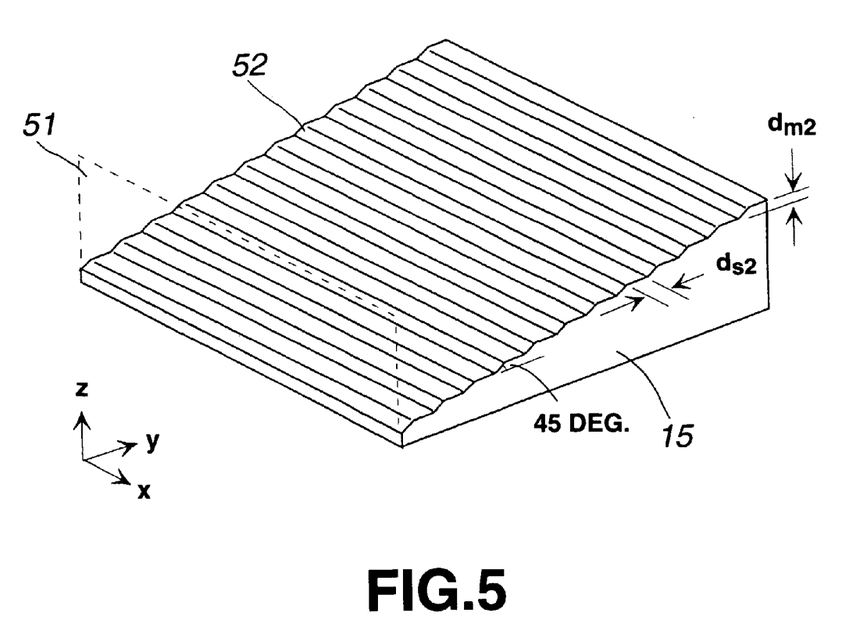
FIG. 5 is a perspective view of a second reflective member of the lighting system.
Figure 6:
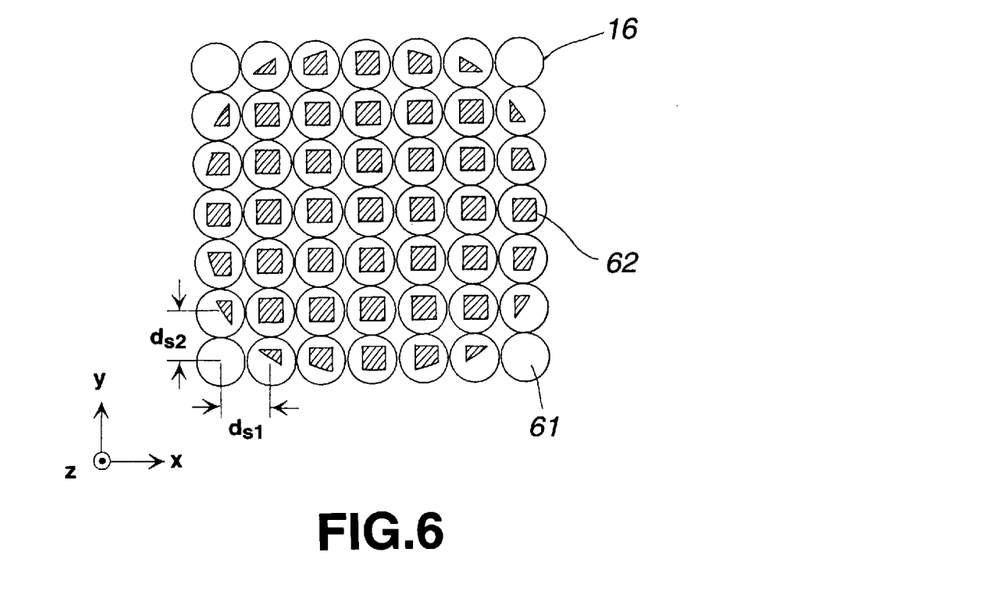
FIG. 6 is a plan view of an lens array of the lighting system.

The outgoing light from the semiconductor-laser light source 11 will have the optical axis thereof deflected 45 deg. by the reflector 12 and travel in the positive-going x-axial direction and then be incident upon the optical element 13. Referring to FIGS. 4 to 6, the construction of the optical element 13 will briefly be described below. FIG. 4 is a perspective view of the first stepped mirror 14, FIG. 5 is a perspective view of the second stepped mirror, and FIG. 6 is a plan view of the lens array 16. First, the incident light beam will travel to the first stepped mirror 14 of the optical element 13. As shown in FIG. 14, the first stepped mirror 14 consists of a plurality of reflectors 42 tilted 45 deg. in relation to a plane of incidence 41 and disposed in parallel to each other and with a distance $d_{s1}$ from their respective neighboring ones. Thus, the incident light beam will have the optical axis thereof deflected by the first stepped mirror 14 through an angle of 45 deg. in the positive-going y-axial direction. That is, the incident light beam will be split into a plurality of strip-shaped light beams spaced a distance $d_{s1}$ from their respective neighboring ones in a plane perpendicular to the y-axis. Also there is a difference $d_{s1}$ in optical path length between the neighboring light beams when the light beams are viewed from the light source.

Thereafter, the split light beams are incident upon the second stepped mirror 15. As shown in FIG. 5, the second stepped mirror 15 consists of a plurality of reflectors 52 tilted 45 deg. in relation to a plane of incidence 52 and disposed in parallel to each other and with a distance $d_{s2}$ from their respective neighboring ones. Thus, the split trip-like incident light beam will have the optical axis thereof deflected by the second stepped mirror 15 through an angle of 45 deg. in the positive-going z-axial direction. That is, the incident light beam will be split into a plurality of lattice-shaped light beams spaced a distance $d_{s1}$ from their respective neighboring ones in the x-axial direction and a distance $d_{s2}$ in the y-axial direction in an x-y plane perpendicular to the z-axis.

Also there are differences in units of $d_{s1}$ and $d_{s2}$ in optical path length between the neighboring light beams. The lens array 16 is disposed in the x-y plane. As shown in FIG. 6, the lens array 16 consists of a plurality of lenses regularly disposed a distance $d_{s1}$ from their respective neighboring ones in the x-axial direction and a distance $d_{s2}$ from their respective neighboring ones in the y-axial direction. Thus, the spilt light beams from the first and second stepped mirrors 14 and 15 are incident upon the one-to-one corresponding lenses included in the lens array 16 and transmitted through the respective lenses.

The light beams having passed through their respective corresponding lenses in the lens array 16 are passed through a condenser lens to illuminate one and the same area on a to-be-illuminated surface disposed at the focal point of the condenser lens.

Eventually there occur differences in optical path length in units of $d_{s1}$ and $d_{s2}$ between the plurality of light beams transmitted through the lens array 16. When the differences $d_{s1}$ and $d_{s2}$ in optical path length meet following relations:

$$(m-1)1_d+1_t/2 \leq d_{s1} \leq m1_d-1_t/2$$

$$(m-1)1_d+1_t/2 \leq d_{s2} \leq m1_d-1_t/2$$

where m is a natural number, the light beams are incoherent with each other.

Figure 7:
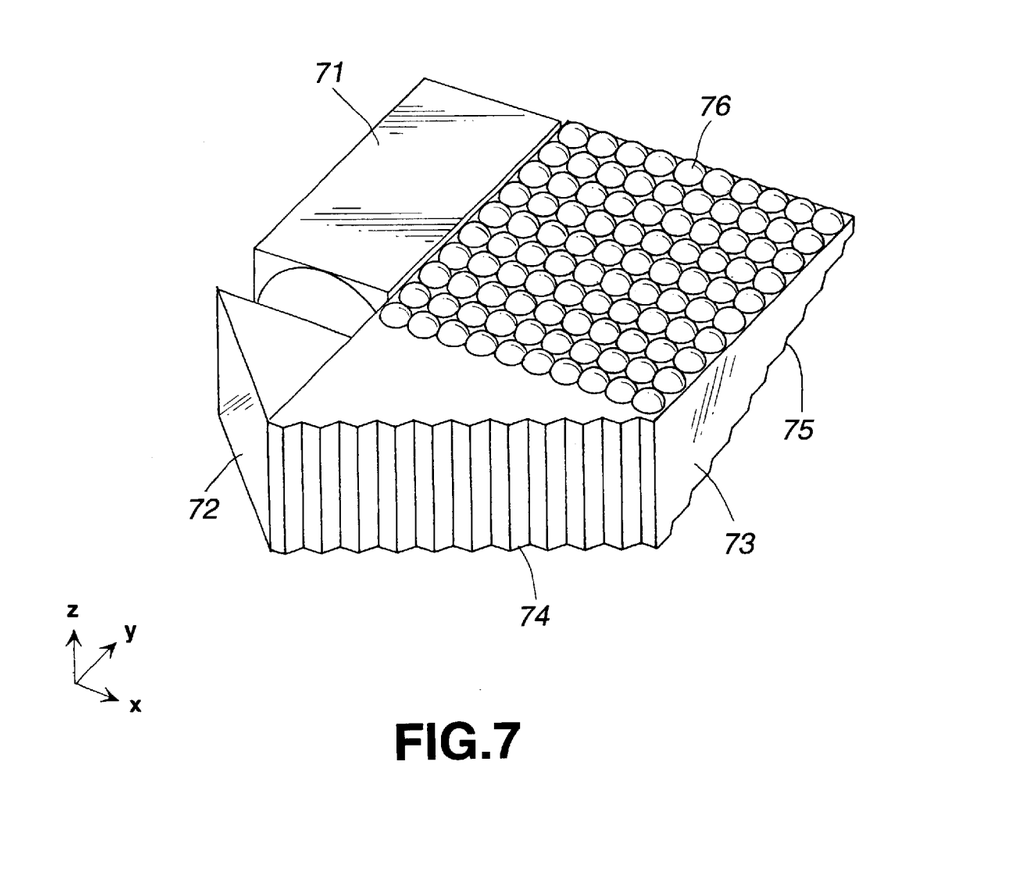
FIG. 7 is a perspective view of another embodiment of the lighting system according to the present invention.

Second embodiment:

Referring now to FIG. 7, there is illustrated a second embodiment of the lighting system according to the present invention. As shown, the lighting system may be composed of a single transparent optical element 73 including a first stepped mirror 74, second stepped mirror 75 and a lens array 76.

The lighting system includes a semiconductor-laser light source 71 which is the same as the semiconductor-laser light source 11 shown in FIG. 1. The semiconductor-laser light source 71 emits a collimated multi-mode coherent light which is incident upon the optical element 73 through a reflector 72.

The optical element 73 is a single transparent prism-like one consisting of the first and second stepped mirrors 74 and 75 and the lens array 76. The optical element 73 may integrally be formed from these components. Alternatively, it may integrally formed by matching the components in refractive index with each other and attaching them to each other. The optical element 73 is designed to have a similar appearance to that of the reflecting surface of the stepped mirrors. Thus, it has the basically same effect as the optical element 13 shown in FIG. 1. That is, a plurality of split light beams is emitted from the lens array 76. If the components of the optical element 73 are made of materials which are the same in refractive index as each other and the refractive index is taken as n, there exist differences in optical path length in units of $nd_{s1}$ and $nd_{s2}$, however, when the differences in optical path length meet following relations:

$$(m-1)1_d+1_t/2 \leq nd_{s1} \leq m1_d-1_t/2$$

$$(m-1)1_d+1_t/2 \leq nd_{s2} \leq m1_d-1_t/2$$

where m is a natural number, the light beams are incoherent with each other.

Also in this optical element, the light beams having passed through their respective corresponding lenses in the lens array 76 are passed through a condenser lens to illuminate one and the same area on a to-be-illuminated surface disposed at the focal point of the condenser lens.

The optical element being a single integral part as in this second embodiment of the present invention, is industrially advantageous since it can be mass-produced inexpensively by an injection molding using a mold. It is essential that the transparent optical element 73 has a high transmittance for the wavelength of an incident light. The optical element 73 may be formed from an optical glass such as quartz glass or an organic material including polycarbonate resin, polymethyl methacrylate, etc.

Generally, these optical materials have a refractive index n larger than 1. Therefore, the optical element 73 formed from one of these materials and having the same size as the optical element 13 shown in FIG. 1 in which the light beams travel in air, can provide a larger difference in optical path length than the optical element 13. Namely, the lighting system as a whole can be designed smaller than the one including the optical element 13.

Further, the transparent optical element 73 may be formed integrally with the reflector 72 and an optical part provided in the semiconductor-laser light source 71 to shape or collimate the outgoing light from the semiconductor laser, whereby the number of parts can be reduced.

Figure 8:
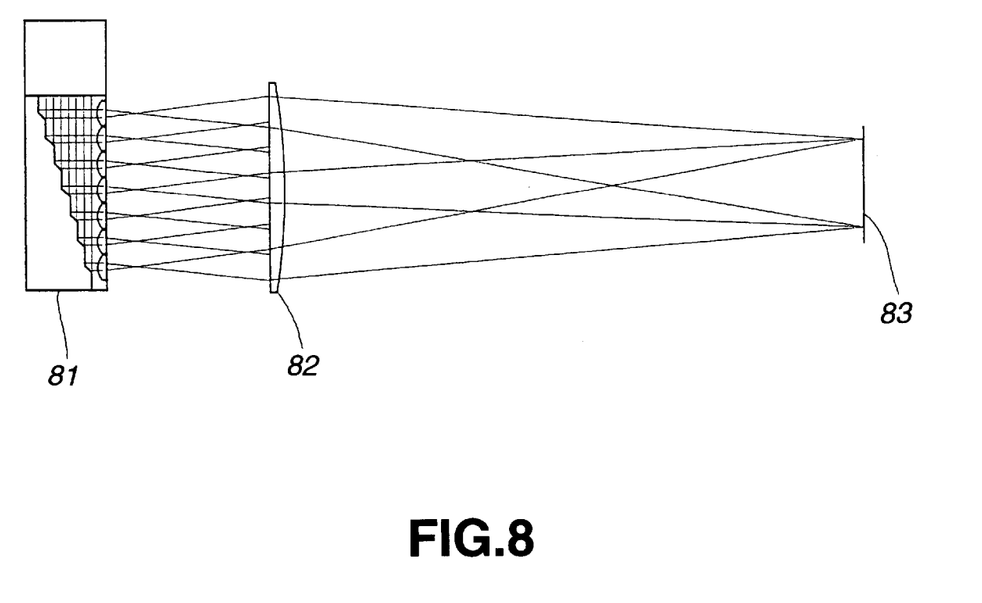
FIG. 8 is a perspective view of an embodiment of the image display apparatus according to the present invention.

Third embodiment 3:

Referring now to FIG. 8, there is illustrated an embodiment of the image display apparatus in which the lighting system according to the present invention is included. As shown, in the image display apparatus includes a lighting system 81 constructed as having been described in the foregoing, a light beam outgoing from the lens array is collimated by each of the element lenses included in the lens array and arrives at a condenser lens 82. A to-be-illuminated surface 83 is disposed in the rear focal plane of the condenser lens 82.

Therefore, the light beams outgoing from the element lenses will illuminate almost one and the same area on the to-be-illuminated surface 83. More particularly, the light beams arriving at one point on the to-be-illuminated surface 83 will be an assembly of the light beams made incoherent with each other due to the difference in optical path length in the lighting system 81, thus the speckles on the illuminated surface 83 can be reduced.

As seen from FIG. 6, since the lighting system 81 is designed to split an incident light beam from the light source in a plane perpendicular to the optical axis of the incident light beam, the light intensity distribution, even if not uniform, on the to-be-illuminated surface 83 is averaged to be uniform. Further, although the to-be-illuminated surface 83 is generally designed to be square, the aspect ratio of the surface 83 can freely be desired by selecting appropriate lengths of the first stepped mirror (or part thereof) and second stepped mirror (or part thereof) of the lighting system 81. That is, when the first and second stepped mirrors similar to those shown in FIGS. 1, 4 and 5, the aspect ratio of the to-be-illuminated surface can freely be designed by selecting appropriate values $d_{m1}$ and $d_{m2}$.

In the image display apparatus incorporating the lighting system according to the present invention, a crystal spatial light modulator may be disposed on the to-be-illuminated surface 83 shown in FIG. 8 to project a light transmitted through, or reflected from, the light modulator onto a screen through a projection lens, thus displaying an image on the screen.

In the embodiments of the present invention having been described in the foregoing, the multi-mode semiconductor laser oscillated with a plurality of frequencies is used as the light source. However, note that the multi-mode semiconductor laser may be a one having a plurality of oscillating wavelengths or may be obtained by superimposing a high frequency signal on an injection current of a semiconductor laser oscillated with a single wavelength. Generally, the first maximum waveform $1_t$ of such a multi-mode semiconductor laser is small, so the lighting system can be constructed relatively easily to provide the aforementioned effect of speckle reduction. However, the coherent light source is not limited to the multi-mode semiconductor laser, but the above principle can be applied to use any laser sources which would provide a coherent light.

As having been described in the foregoing, the lighting system according to the present invention and image display apparatus using the lighting system are compact and can be mass-produced expensively, but it can effectively reduce the spatial coherence at the light-outgoing face since an incident light is split into a plurality of light beams and there occurs a difference in optical path length between the light beams.

Also, use as the light source of a multi-mode laser having a plurality of different oscillating wavelengths permits to optimize the difference in optical path length by the use of the periodic degree of coherence, and thus permits to effectively reduce the spatial coherence.

In the lighting system according to the present invention, an incident light is split into a plurality of light beams, there occurs a difference in optical path length and each of the light beams is emitted through a corresponding lens, to assure a uniform illumination with less speckles. Therefore, the image display apparatus incorporating the lighting system can be built from a reduced number of parts, requiring no high-precision positioning, and thus it can be designed compact and display a quality image with less speckle noises.

What is claimed is:

1. A lighting system, comprising:
    a first reflective member having a plurality of reflecting faces disposed obliquely with an angle of about 45 deg. with respect to the optical axis of an incident coherent light, respectively, and spaced a predetermined distance from each other in the optical-axial direction of the incident coherent light;
    a second reflective member having a plurality of reflecting faces disposed obliquely at an angle of about 45 deg. with respect to the optical axes of reflected light beams, respectively, from the first reflective member, and spaced a predetermined distance from each other in the optical-axial direction of the incident coherent light;
    a lens array having a plurality of lenses disposed in planes generally perpendicular to the optical axes of the reflected light beams from the second reflective member; and
    a condenser lens;
    the incident coherent light being sequentially reflected by the first and second reflective members to split the incident coherent light beam into a plurality of light beams having predetermined differences in optical path length from each other, the plurality of light beams being guided for incidence upon the lenses included in the lens array and corresponding one-to-one to the light beams, and transmitted through the condenser lens, thereby illuminating one and the same area on a to-be-illuminated surface disposed at a focal point of the condenser lens.

2. The apparatus as set forth in claim 1, wherein the difference in optical path length between the plurality of light beams resulted from splitting of the incident coherent light is longer than the coherence length of the incident coherent light.

3. The apparatus as set forth in claim 1, further comprising:
    a light source to generate a coherent light for incidence upon the first reflective member; wherein the incident light upon the first reflective member has a plurality of difference periodic oscillating frequencies and when the degree of coherence of the incident light is expressed as a function of time, the full width at half maximum of a first maximum waveform is taken as $\tau_t$, the maximum distance between the first maximum waveform and a second maximum waveform neighboring the first maximum waveform is taken as $\tau_d$, a plurality of reflecting faces forming the first reflective member is disposed a predetermined distance $d_1$ from each other and a plurality of reflecting faces forming a second reflective member is disposed a predetermined distance $d_2$ from each other, the predetermined distances $d_1$ and $d_2$ have following relations between them:

$$c\{(n-1)\tau_d+\tau_t/2\} \leq d_1 \leq c(n\tau_d-\tau_t/2)$$

$$c\{(n-1)\tau_d+\tau_t/2\} \leq d_2 \leq c(n\tau_d-\tau_t/2)$$

where c is a speed of light and n is a natural number.

4. A lighting system, comprising:
    an optical element formed integrally from:
        a first reflective member having a plurality of reflecting faces disposed obliquely with an angle of about 45 deg. with respect to the optical axis of an incident coherent light, respectively, and spaced a predetermined distance from each other in the optical-axial direction of the incident coherent light;
        a second reflective member having a plurality of reflecting faces disposed obliquely at an angle of about 45 deg. with respect to the optical axes of reflected light beams, respectively, from the first reflective member, and spaced a predetermined distance from each other in the optical-axial direction of the incident coherent light; and
        a lens array having a plurality of lenses disposed in planes generally perpendicular to the optical axes of the reflected light beams from the second reflective member; and
    a condenser lens;
    the incident coherent light being sequentially reflected by the first and second reflective members to split the incident coherent light beam into a plurality of light beams having predetermined differences in optical path length from each other, the plurality of light beams being guided for incidence upon the lenses included in the lens array and corresponding one-to-one to the light beams, and transmitted through the condenser lens, thereby illuminating one and the same area on a to-be-illuminated surface disposed at a focal point of the condenser lens.

5. The apparatus as set forth in claim 4, wherein the difference in optical path length between the plurality of light beams resulted from splitting of the incident coherent light is longer than the coherence length of the incident coherent light.

6. The apparatus as set forth in claim 4, further comprising:
    a light source to generate a coherent light for incidence upon the first reflective member; wherein the incident light upon the first reflective member has a plurality of difference periodic oscillating frequencies and when the degree of coherence of the incident light is expressed as a function of time, the full width at half maximum of a first maximum waveform is taken as $\tau_r$, the maximum distance between the first maximum waveform and a second maximum waveform neighboring the first maximum waveform is taken as $\tau_d$, a plurality of reflecting faces forming the first reflective member is disposed a predetermined distance $d_1$ from each other and a plurality of reflecting faces forming a second reflective member is disposed a predetermined distance $d_2$ from each other, the predetermined distances $d_1$ and $d_2$ have following relations between them:

$$c\{(n-1)\tau_d + \tau_r/2\} \leq d_1 \leq c(n\tau_d - \tau_r/2)$$

$$c\{(n-1)\tau_d + \tau_r/2\} \leq d_2 \leq c(n\tau_d - \tau_r/2)$$

where c is a speed of light and n is a natural number.

7. An image display apparatus, comprising:

a lighting bock including:

a first reflective member having a plurality of reflecting faces disposed obliquely with an angle of about 45 deg. with respect to the optical axis of an incident coherent light, respectively, and spaced a predetermined distance from each other in the optical-axial direction of the incident coherent light;

a second reflective member having a plurality of reflecting faces disposed obliquely at an angle of about 45 deg. with respect to the optical axes of reflected light beams, respectively, from the first reflective member, and spaced a predetermined distance from each other in the optical-axial direction of the incident coherent light;

a lens array having a plurality of lenses disposed in planes generally perpendicular to the optical axes of the reflected light beams from the second reflective member; and a condenser lens;

the incident coherent light being sequentially reflected by the first and second reflective members to split the incident coherent light beam into a plurality of light beams having predetermined differences in optical path length from each other, the plurality of light beams being guided for incidence upon the lenses included in the lens array and corresponding one-to-one to the light beams, and transmitted through the condenser lens, thereby illuminating one and the same area on a to-be-illuminated surface disposed at a focal point of the condenser lens; and an image display block illuminated by the lighting block to display an image.

\* \* \* \* \*